W. C. MARTIN.
CUSHION WHEEL CONSTRUCTION.
APPLICATION FILED FEB. 3, 1919.
1,333,929.
Patented Mar. 16, 1920.
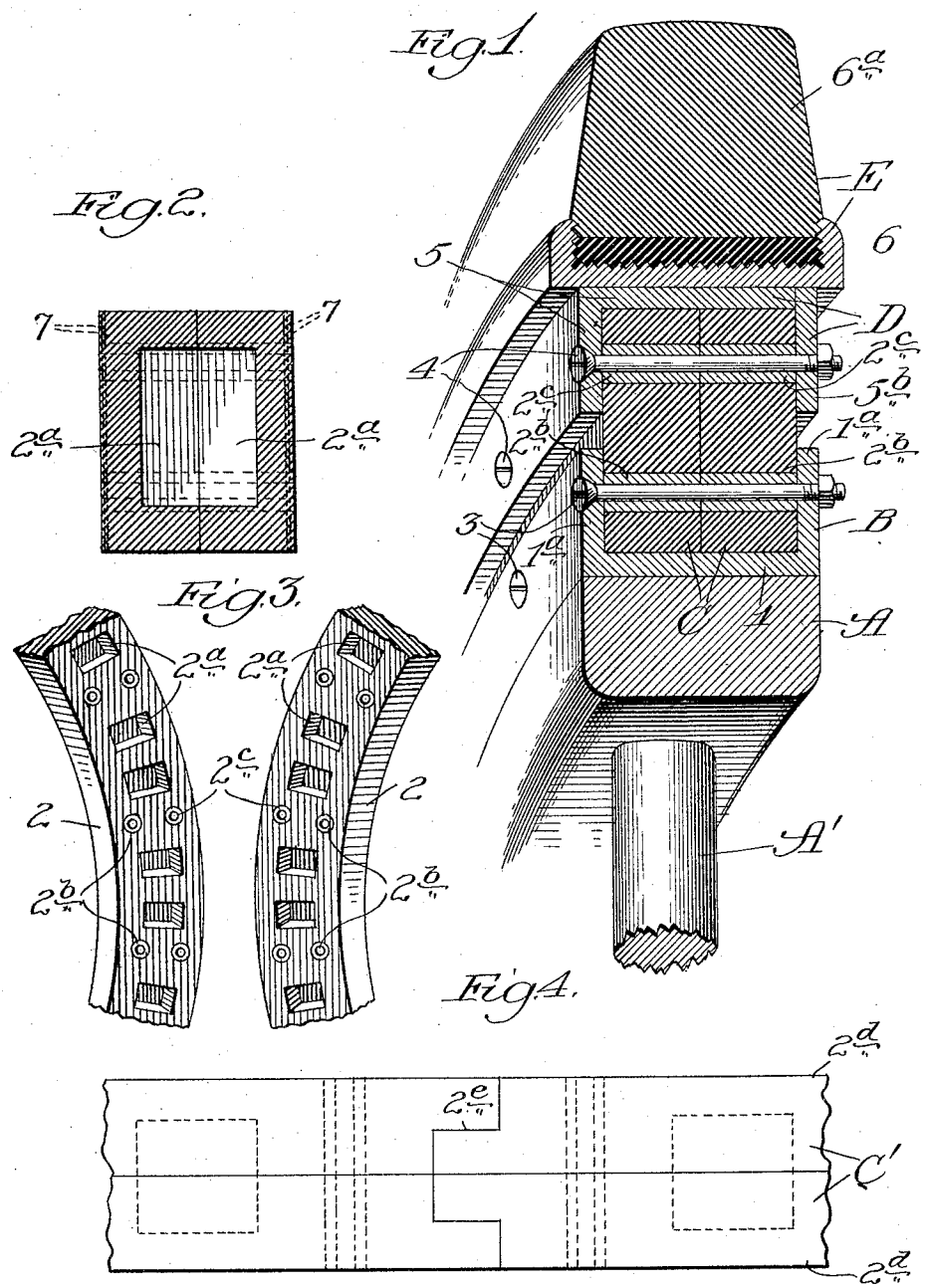

UNITED STATES PATENT OFFICE.

WILLIAM C. MARTIN, OF CHICAGO, ILLINOIS, ASSIGNOR TO MORAND BROS.-MARTIN CUSHION WHEEL COMPANY, OF CHICAGO, ILLINOIS, A CORPORATION OF ILLINOIS.

CUSHION-WHEEL CONSTRUCTION.

1,333,929. Specification of Letters Patent. Patented Mar. 16, 1920.

Application filed February 3, 1919. Serial No. 274,714.

*To all whom it may concern:*

Be it known that I, WILLIAM C. MARTIN, a citizen of the United States, residing at Chicago, in the county of Cook and State of Illinois, have invented a new and useful Improvement in Cushion-Wheel Construction, of which the following is a specification.

This invention relates particularly to cushion-wheels adapted for use on automobiles, and especially auto-trucks.

The primary object is to provide a very simple and comparatively inexpensive cushion-wheel in which provision is made for distributing shocks throughout the circumference of the special cushion-element employed, and thus obviating the injuries which would otherwise arise.

The invention is illustrated, in its preferred embodiment, in the accompanying drawing, in which—

Figure 1 represents a broken sectional perspective view of a cushion-wheel construction embodying the invention; Fig. 2, a sectional view of the special rubber cushion-element employed, the section being taken parallel to the section shown in Fig. 1; Fig. 3, a broken perspective view illustrating the construction of the two-part special cushion-element employed; and Fig. 4, a broken plan view showing a modification of the cushion-element.

Referring to Figs. 1 to 3, inclusive, A represents the felly of a wheel supported by spokes $A^1$; B, an inner annular channel-form cushion-rim mounted on the felly A; C, a two-part cushion-element whose inner circumferential portion is mounted in and secured to the inner cushion-rim B; D, an outer channel-form cushion-rim which receives and has firmly secured therein the outer circumferential portion of the cushion-element C; and E, tire mounted on the outer cushion-rim D.

The inner cushion-rim B preferably comprises an integral annular steel member of channel-form cross-section, which is shrunk upon the felly A, the rim having the felly-embracing portion 1, and the outwardly-extending side-flanges $1^a$.

The cushion-element C comprises two annular elastic rubber cushion-members 2, which are provided at their inner or adjacent sides with an annular series of recesses $2^a$. Each of the rubber cushion-members 2 is provided with an inner annular series of metal bushings $2^b$ and an outer annular series of metal bushings $2^c$. When the parts are assembled, the outer annular series of bushings $2^c$ register with each other, and the inner annular series of bushings $2^b$ register with each other. As shown, the bushings have their end surfaces flush with the lateral surfaces of the cushion-members, so that the bushings abut against each other at their inner ends, and abut against the flanges of the cushion-rims at their outer ends. Also, the recesses $2^a$ of the cushion-members are preferably complemental to each other, so that two of these recesses taken together form an air-cell in the cushion-element C. The cushion-members are firmly secured to the flanges $1^a$ of the inner cushion-rim by an annular series of bolts 3, which extend through the flanges $1^a$ and the interposed bushings $2^b$. The cushion-members are secured to the outer cushion-rim by means of an annular series of bolts 4, which extend through the flanges of the rim and the interposed bushings $2^c$.

Preferably, the outer cushion-rim D has a removable flange to facilitate the assembling of the parts. As shown, the rim comprises an angle-form member having a tread-portion 5 and a side-flange $5^a$ formed integrally therewith; and a removable flange $5^b$.

The tire E preferably comprises a steel tire-member 6, of channel-form, and a rubber tire-member $6^a$ vulcanized in or on the base afforded by the member 6.

It is preferred to form each of the cushion-members 2 as a complete annulus. This may be done by molding a suitable rubber composition in a mold of annular form, the mold being equipped with core-projections to form the recesses $2^a$. The bushings are preferably embedded and molded in a rubber cushion-member in a molding operation. It is desirable, also, to provide the outer lateral surface of each cushion-member with reinforcing plies of fabric, such as canvas, as indicated by the numeral 7 in Fig. 2. The reinforcing does not interfere with the resilience of the cushion-members under compression, and does not prevent the utilization of the elasticity of the rubber under distention in ordinary operation. It may be remarked, however, that if the wheel center is forced in an unusual degree toward an eccentric position, the reinforcement, becoming stretched more and more tautly, tends to prevent undue deformation of the wheel.

Instead of constructing each cushion-member in the form of an integral annulus, each cushion-member may be molded in one or more sections, which, when put together, make the complete annulus. For instance, each annular cushion-member may comprise two semi-circular parts, which when put together form the complete annulus. This form of construction is illustrated in Fig. 4, in which C¹ represents a cushion-element comprising two annular cushion-members 2ᵈ. Each annular member 2ᵈ consists of two semi-annular members, the ends of which are stepped or tenoned to afford an overlapping joint, as indicated at 2ᵉ. The inner lateral surfaces of the cushion-members are provided with recesses to afford cells, or air-chambers, as in the first-described construction; and the cushion-members are provided with bushings which are adapted to register and receive bolts for connection with the flanges of the cushion-rims.

In assembling the construction, the inner cushion-rim B is shrunk upon the felly A; the molded cushion-members 2 are then forced over and entered between the flanges 1ª of the inner rim; the angle-form portion of the outer cushion rim is then forced on the cushion, and the flange 5ᵇ applied, the cushion-members being secured to the rims by means of the annular series of bolts 3 and 4; and finally the wheel is forced into the tire under pressure of many thousands of pounds. If desired, it is practicable to force the angular portion of the outer rim into the tire and then apply the tire and outer rim to the cushion-element. In this case, some of the bolts 5 may be entered through the flange 5ª to serve as guides, applying the tire to the cushion-element. It will be seen, therefore, that it is practicable to provide an extra tire equipped with an outer cushion-rim mounted therein, so that in case of necessity the tire may be removed from the wheel and a new tire applied.

In the operation of the improved wheel, when the wheel encounters an obstruction in the road the shock occasioned thereby is distributed throughout the circumference of the cushion-element and thereby dissipated. In accomplishing its function, the cushion-element acts under compression at some portions and under distention at other portions, the resistance to deformation of the wheel occurring throughout the entire circumference of the wheel.

The two-part cushion element is so constructed as to tend to economy, lightness, and durability. The necessary strength of the base-portions of the cushion-element, that is the portions which are firmly attached to the inner and outer cushion-rims, is preserved, while the requisite resiliency is secured by lightening the rubber at the intermediate portions of the rubber annuli. It may be observed, also, that the construction is such as to permit the necessary radial movement to give play to the resiliency of the rubber, and is also such as to resist lateral shocks, such as may occur in striking a curb, as in rounding a corner.

In case each rubber member is molded in sections adapted to form a complete annulus when put together, these sections may be laid in the channel afforded by the inner cushion-rim and bolted in place; and when bolted together the complete annular rubber cushion-element is thus provided. It may be remarked, however, that for light and moderately heavy auto-truck purposes, it is quite feasible to mold each annular cushion-member in integral form, as the member is sufficiently flexible to enable it to be forced over the flange of the inner cushion-rim in entering the member in its seat.

The present invention constitutes a modification of the invention disclosed in my application No. 261,314, filed November 6, 1918.

The foregoing detailed description has been given for clearness of understanding only, and no unnecessary limitation should be understood therefrom, but the appended claims should be construed as broadly as permissible, in view of the prior art.

What I regard as new, and desire to secure by Letters Patent, is:—

1. A cushion-wheel construction comprising an inner annular channel-form cushion-rim and an outer annular channel-form cushion-rim, the said rims being spaced apart and having their flanges extending toward each other; an interposed two-part cushion-element comprising two annular elastic rubber cushion-members provided with inner series of bushings which abut against each other and are interposed between the flanges of the inner cushion-rim, and outer series of bushings which abut against each other and are interposed between the flanges of the outer cushion-rim; and annular series of bolts connecting the flanges of each cushion-rim and extending through the interposed series of bushings.

2. In cushion-wheel construction, the combination of a pair of annular cushion-rims which are spaced apart and equipped with flanges extending toward each other, a flange of one of said rims being separable; a two-part cushion-element comprising two annular elastic rubber cushion-members disposed side by side and seated in the channels of said cushion-rims, said cushion-members having inner annular series of registering bushings and outer annular series of registering bushings, the annular portions of said cushion-members between the inner and outer annular series of bushings being provided with recesses; and annular series of bolts connecting the flanges of said cushion-rims and extending through the corresponding series of interposed bushings.

3. In cushion-wheel construction, the combination of inner and outer annular channel-form cushion-rims spaced apart; and an annular two-part cushion element, comprising two annular resilient rubber cushion-members having their inner circumferential portions seated in and firmly secured to said inner cushion-rim, and having their outer circumferential portions seated in and firmly secured to said outer cushion-rim, said cushion-members having concealed recesses affording air-chambers and having their outer lateral surfaces provided with reinforcement.

WILLIAM C. MARTIN.